United States Patent Office 3,479,175
Patented Nov. 18, 1969

3,479,175
METHOD OF MAKING A LIGHTWEIGHT FERTILIZER CONTAINING UREA AND FORMALDEHYDE
Allen Milton Murphy, Jr., and Franklin Albert Retzke, Virginia Beach, Va., and John Raymond Johnson, Bradenton, Fla., assignors to The Borden Company, New York, N.Y., a corporation of New Jersey
No Drawing. Filed Nov. 7, 1966, Ser. No. 592,291
Int. Cl. C05c 9/02; C05d 1/00; C05g 1/00
U.S. Cl. 71—29          6 Claims

ABSTRACT OF THE DISCLOSURE

This invention relates to lightweight plant fertilizers having a bulk density of not more than about 40 pounds per cubic foot and comprising a urea and a dry source of formaldehyde reactive with urea in the ratio of at least about 6 moles of urea to 1 mole of formaldehyde and containing between about 20 and 40% by weight of nitrogen, between about 5 and 45% by weight of phosphorus (calculated as $P_2O_5$) and between about 5 and 25% by weight of potassium (calculated as $K_2O$), the combined weight of the nitrogen, phosphorus and potassium content of the fertilizer being at least 40% of the total weight of the fertilizer and to the method of making such fertilizers by extrusion as hereinafter more specifically described.

---

Compositions which contain nitrogen, phosphorus and potassium in a form that makes these essential elements available to plant life when spread on or mixed with the soil in which plants are growing are commonly referred to as complete fertilizers. One important use for complete fertilizers is in the care and feeding of home lawns and gardens. Fertilizers used for this purpose advantageously should have a high nutritional value and should be easy to apply either by hand or by means of simple mechanical spreaders. Such fertilizers, therefore, advantageously have a relatively high nitrogen, phosphorus and potassium content and are in the form of dry, readily spreadable granules or pellets of uniform composition. Moreover, they advantageously have a relatively low bulk density (i.e., a low weight to volume ratio) so as to facilitate handling and provide adequate lawn coverage per pound of fertilizer.

Fertilizers having a relatively high content of nitrogen, phosphorus and potassium are referred to as "high analysis" fertilizers, and as employed herein this term refers specifically to compositions containing at least 20% by weight of nitrogen and in which the combined weight of the nitrogen, phosphorus (calculated as $P_2O_5$) and potassium (calculated as $K_2O$) content of the fertilizer comprises at least about 40% by weight of the total weight thereof. High analysis fertilizers have in the past been formulated from conventional fertilizer constituents. However, such fertilizers are difficult to compound and manufacture so as to obtain a dry, non-crumbling, granular, easily spreadable product of uniform composition. Moreover, high analysis fertilizers ordinarily have a relatively high bulk density or weight per unit volume—generally in excess of about 60 to 80 pounds per cubic foot—that makes these fertilizers too dense or heavy for easy application and for adequate coverage per pound of the composition. The mechanical properties of high analysis fertilizers can be improved and the density of the fertilizer reduced by the addition thereto of a lightweight filler such as vermiculite, and such lightweight fillers sometimes comprise as much as 20% by weight of the fertilizer composition. However, the use of a low density filler dilutes the fertilizer composition and therefore reduces the analysis or grade of the product.

It has now been discovered that high analysis mechanically strong lightweight fertilizers can be produced without the use of fillers if desired by extruding certain fertilizer compositions comprising at least about 6 moles of urea for each mole of a dry source of formaldehyde reactive with urea within a specified temperature range, the extruded product being in the form of easily handled non-crumbling pellets of uniform composition having a bulk density of not more than about 40 pounds per cubic foot and containing at least 20% by weight of nitrogen. The process for producing such high analysis lightweight fertilizers comprises forming a mixture containing at least about 20% by weight of urea, at least one phosphorus-containing compound selected from the group consisting of monoammonium phosphate, diammonium phosphate, monocalcium phosphate, and potassium phosphate, at least one potassium-containing compound selected from the group consisting of potassium chloride, potassium sulfate, potassium nitrate and potassium phosphate, and dry source of formaldehyde reactive with urea such as paraformaldehyde, the amount of the urea phosphorus-containing and potassium-containing compounds in the mixture being such that the mixture contains between about 20 and 40% by weight of nitrogen, between about 5 and 45% by weight of phosphorus (calculated as $P_2O_5$), between about 5 and 25% by weight of potassium (calculated as $K_2O$), the combined weight of the nitrogen, phosphorus and potassium content of the mixture being at least 40% of the total weight of the mixture, and at least 6 moles of said urea for each mole of formaldehyde reactive with urea. The aforesaid mixture is thoroughly blended and is heated to a temperature above about 150° F. and below that at which melting and slurrying of the mixture occurs, and preferably to a temperature between about 160° and 175° F. The heated mixture is then extruded while it is at a temperatlre of above 150° F. and below about 180° F. The extrusions are then cooled to obtain a dry, granular high analysis fertilizer having a bulk density of not more than about 40 pounds per cubic foot.

Urea is the principal source of nitrogen in the fertilizer. Chemically pure urea is a white crystalline substance having a melting point of about 271° F.; however, commercially available urea may have a lower or higher melting point due to the presence of impurities and polyureas therewith, and such commercial grades as regular prilled, micro-prilled feed grade and crystalline urea obtained from various commercial suppliers have been successfully used in the practice of the invention. If desired to have a portion of the urea in the lightweight fertilizer product in a relatively water insoluble form, a portion of the urea content of the mixture can be replaced by an equivalent amount of a solid urea-formaldehyde resin.

The ratio of nitrogen containing compound (U) to paraformaldehyde (F) is critical. U/F ratios up to 20:1 can be used, but a ratio of at least about 6:1 is required. U/F ratios below this result in a product lacking mechanical strength even if large amounts of filler are used.

In addition to the urea constituents of my lightweight fertilizer, the fertilizer mixture includes phosphorus-containing and potassium - containing compounds in amounts sufficient to produce a complete fertilizer product of the desired ccmposition. The phosphorus-containing compounds comprising one or more of the constituents of my fertilizer composition should be selected from among those compounds which have a relatively high phosphorus content in a form available to plant life. Moreover, the phosphorus compound also advantageously contains one or more of the other elements essential to plant growth, particularly nitrogen and potassium. Among the compounds which can be successfully employed in the preparation of lightweight fertilizers in accordance with the invention are monoammonium phosphate, diammonium phosphate, calcium phosphate, and potassium phosphate. Similarly, the potassium-containing compounds should contain a relatively high proportion of potassium in a readily available form, and advantageously may also contain one or more of the other elements essential to plant growth. Among the potassium compounds that can be successfully employed in the formulation of lightweight fertilizers in accordance with my invention are potassium chloride, potassium sulfate, potassium nitrate and potassium phosphate.

The lightweight high analysis fertilizer is prepared from initial mixture of between about 30 and 80% by weight of the urea and urea-containing compounds, between about 7 and 35% by weight of one or more of the phosphorus-containing compounds, and between about 13 and 45% by weight of one or more of the potassium-containing compounds. The formaldehyde is preferably present in the amount of 1 mol for each 10 moles of urea, although the urea to formaldehyde ratio may vary from 6:1 to 20:1. The fertilizer mixture may contain minor amounts of a lightweight filler such as ground corn cobs or vermiculite if a low analysis fertilizer is needed for some specialized use. Moreover, the amount of each of the several ingredients present in the initial mixture is such that the ultimate fertilizer product will contain at least 20%, and preferably between 20 and 40%, by weight of nitrogen, at least 5%, and preferably between 5 and 45%, by weight of phosphorus (calculated as $P_2O_5$) and at least 5%, and preferably between 5 and 25%, by weight of potassium (calculated as $K_2O$), the combined weight of nitrogen, phosphorus (calculated as $P_2O_5$) and potassium (calculated as $K_2O$) therein comprising at least about 45% by weight of the fertilizer on a dry basis. Within these limits the actual amount of each of the starting materials present in the initial mixture will depend upon the desired nitrogen, phosphorus and potassium content of the lightwenght fertilizer product being prepared.

The various starting materials are thoroughly blended to form an essentially homogeneous mixture, and the mixture is heated from ambient temperature to a temperature below that at which melting and slurrying of the mixture occurs; preferably, to a temperature between about 140° F. and 175° F. Urea, one of the principal ingredients of the mixture, tends to react to form biuret when heated to elevated temperatures, and biuret is an undesirable contaminant when present in plant fertilizers. It has been found advisable to avoid heating or extruding the mixture at a temperature above about 180° F. in order to avoid forming agronomically harmful amounts of biuret. Blending of the material is advantageously continued throughout the heating operation, and it is preferred to heat the mixture in an externally heated screw conveyor in which the material is brought to the desired extrusion temperature as it is worked from the feed end to the discharge end of the screw conveyor.

The heated mixture is a rather stiff, dry, pasty, or plastic material which is extruded while at a temperature of between about 150° F. and 180° F., and preferably between about 160 and 175° F., by means of conventional extrusion equipment. The extrusion apparatus is advantageously of the auger type wherein the heated mixture is forced by the auger through a die plate having a plurality of small (e.g. about one-eighth inch diameter) holes formed therein. Moreover, the hot, rather plastic extruded material issuing from the die plate is advantageously cut by an appropriate cutting mechanism into small cylindrical particles of any desired predetermined length. The extruded particles of the fertilizer product are allowed to cool to form a relatively hard, dry product. A urea/formaldehyde molar ratio below about 6:1 is not operable in this invention since the resultant product is not sufficiently hard and crumbles making it commercially unusable. The particles of the fertilizer product are then advantageously sized to remove excessively large or small particles of the fertilizer and to obtain a commercially marketable product of relatively uniform size (for example, a product advantageously between about 6 mesh and 10 mesh Tyler Standard). The under-size and oversize material, if any, is advantageously crushed and recycled through the process. The fertilizer product has a bulk density of not more than about 40 pounds per cubic foot, and typically about 35 pounds per cubic foot, without need for lightweight fillers.

The following specific examples are illustrative but not limitative of the practice of the invention:

Example 1

An initial lightweight fertilizer mixture was prepared by intimately blending 1436 pounds of ground crystalline urea, 189 pounds of diammonium phosphate produced from furnace grade acid, 334 pounds of commercial grade potassium chloride and 41 pounds of finely ground paraformaldehyde. The mole ratio of urea to paraformaldehyde was 17:1. The blended mixture was fed at the rate of 300 pounds per hour to a jacketed screw conveyor about 4 inches in diameter and 6 feet long. The heated mixture was then fed while at a temperature of about 150° F. to an auger-type pin barrel extruder provided with a die plate containing 320 one-eighth inch diameter holes. The temperature of the mixture at the die plate was approximately 165° F. The cylindrical extrusions emerging from the die plate were cut by means of a rotating piano wire cutter, and the short cylindrical lengths resulting therefrom were dropped onto an eight-inch wide conveyor belt for conveying to the sizing apparatus. The extrusions were screened at a temperature of about 140° F. to obtain a minus 6 mesh and plus 10 mesh product having a bulk density of 38 pounds per cubic foot. The product was analyzed and found to contain 35.18% N, 5.50% $P_2O_5$, and 9.92% $K_2O$. The undersize and oversize extrusions from the screening operation were recycled through the heating and extruding operation.

The product was dry and had excellent mechanical strength. The product was packaged in 50 pound bags and the bags subjected to severe handling and physical abuse without significant deterioration of the product contained therein. Tests of the fertilizer product on experimental plots showed that in all cases it gave quick and long-lasting results.

Examples 2–5

Four lightweight fertilizers were formulated as in Example 1 utilizing in place of the potassium chloride, potassium nitrate. Also, varying amounts of corn cob having a size of 24 x 48 mesh were added as filler. The theoretical N, $P_2O_5$, and $K_2O$ content of each formulation and the actual amount of each component present in the formulations are set forth in the following table:

|  | Examples | | | |
| --- | --- | --- | --- | --- |
|  | 2 | 3 | 4 | 5 |
| Raw material | 30–10–10 | 30–5–8 | 25–10–5 | 24–8–8 |
| Parts by weight: | | | | |
| Urea | 50.70 | 55.85 | 36.55 | 42.15 |
| Diammonium phosphate | 19.05 | 9.45 | 19.05 | 15.30 |
| Potassium nitrate | 22.95 | 18.20 | 34.55 | 18.45 |
| Filler | 4.30 | 13.50 | 6.85 | 21.10 |
| Paraformaldehyde | 3.00 | 3.00 | 3.00 | 3.00 |
| Total | 100.00 | 100.00 | 100.00 | 100.00 |
| Density | 36 | 36 | 36 | 33 |
| U/F ratio | 8.4:1 | 9.3:1 | 6.1:1 | 7:1 |

In each case the resultant product was sufficiently hard and resisted disintegration upon commercial handling.

Example 6

A lightweight fertilizer was prepared as in Example 1, having the same formulation as the product of Example 5 except that 6 parts by weight of paraformaldehyde were used in place of the 3 parts by weight used therein. The U/F molar ratio was 3.5:1. The resultant product did not have the mechanical strength and the pellets disintegrated during the normal handling involved in bagging, storing, and shipping.

Example 7

A 33-5-10 lightweight fertilizer was prepared by intimately blending 189 pounds diammonium phosphate, 1436 pounds of feed grade urea having an analysis of 44-0-0, 334 pounds of potassium chloride and 41 pounds of finely ground paraformaldehyde. The blended mixture was then processed as set forth in Example 1 and the extruded pellets had a bulk density of 38 pounds per cubic foot and had excellent mechanical strength. The product was analyzed and found to contain 33.57% N, 5.01% $P_2O_5$, and 10.35% $K_2O$.

While the precise theory is not completely understood it is believed that a reaction takes place between the urea and formaldehyde during mixing, heating, and extrusion resulting in urea-formaldehyde compounds of small chain length and water. In the reaction one mole of water is released for each mole of formaldehyde and this controlled amount of moisture acts as a lubricant for the material as it passes through the extruder die plate and subsequently to give high production rates and pellets of high strength. Thus, the formaldehyde acts as an internal plasticizer for the product.

It will be understood that it is intended to cover all changes and modifications of the examples of the invention herein chosen for the purpose of illustration which do not constitute departures from theh spirit and scope of the invention.

What is claimed is:

1. Process for producing lightweight high analysis extruded fertilizer granules having a bulk density of not more than about 40 pounds per cubic foot and containing at least about 20% by weight of nitrogen which comprises: forming a mixture of at least about 30% by weight of urea and urea-formaldehyde resin, and at least one phosphorus-containing compound selected from the group consisting of monoammonium phosphate, diammonium phosphate, monocalcium phosphate, potassium phosphate and phosphoric acid, at least one potassium-containing compound selected from the group consisting of potassium chloride, potassium sulfate, potassium nitrate and potassium phosphate, and a dry source of formaldehyde reactive with urea, the amount of the urea, phosphorus-containing and potassium-containing compounds in the mixture being such that the mixture contains at least about 20% by weight of nitrogen, at least about 5% by weight of phosphorus (calculated as $P_2O_5$) and at least about 5% by weight of potassium (calculated as $K_2O$) and the molar ratio of urea compound to formaldehyde being at least about 6:1; blending and heating the aforesaid mixture to a temperature of above about 150° F. and below that at which melting and slurrying of the mixture occurs; extruding the heated mixture while it is at a temperature between about 150° and 180° F.; and cooling the extruded mixture to obtain a hard, dry, granular fertilizer product.

2. The process for producing lightweight high analysis fertilizer according to claim 1, in which the mixture is continuously blended while being heated to a temperature of between about 150° and 180° F. prior to the extrusion thereof.

3. The process for producing lightweight high analysis fertilizer according to claim 1, in which the heated mixture is extruded while at a temperature between about 160° and 175° F.

4. The process for producing lightweight high analysis fertilizer according to claim 1, in which the extruded fertilizer material is subjected to a sizing operation to obtain a product substantially all of which is between 0.131 inch and 0.065 inch in size.

5. The process according to claim 4, in which the oversize and undersize from the sizing operation is recycled to the start of the process.

6. The product prepared by the process of claim 3.

References Cited

UNITED STATES PATENTS

| | | | |
|---|---|---|---|
| 2,124,332 | 7/1938 | De Rewal | 71—28 |
| 2,955,930 | 10/1960 | Kealy | 71—29 |

FOREIGN PATENTS 241,573  1/1960  Australia.

S. LEON BASHORE, Primary Examiner

R. D. BAJEFSKY, Assistant Examiner

U.S. Cl. X.R.

71—64